United States Patent
Fox

(10) Patent No.: US 6,289,659 B1
(45) Date of Patent: Sep. 18, 2001

(54) DUAL PIVOT HEIGHT SENSING SHOE ASSEMBLY

(75) Inventor: Jeffery Robert Fox, Minburn, IA (US)

(73) Assignee: Deere & Company, Moline, IL (US)

( * ) Notice: Subject to any disclaimer, the term of this patent is extended or adjusted under 35 U.S.C. 154(b) by 0 days.

(21) Appl. No.: 09/429,176

(22) Filed: Oct. 28, 1999

(51) Int. Cl.$^7$ .......................... A01D 75/00; A01D 63/00
(52) U.S. Cl. .................... 56/10.2 E; 56/DIG. 3; 56/DIG. 10
(58) Field of Search .................. 56/10.2 E, 10.2 R, 56/16.7, DIG. 3, DIG. 10, DIG. 15, 208

(56) References Cited

U.S. PATENT DOCUMENTS

| | | | |
|---|---|---|---|
| 3,163,974 | * 1/1965 | Mack | 56/10.2 E |
| 3,643,407 | * 2/1972 | Hubbard et al. | 56/10.2 E |
| 3,925,971 | * 12/1975 | Goering et al. | 56/208 |
| 4,229,931 | * 10/1980 | Schlueter et al. | 56/10.2 E |
| 5,090,184 | 2/1992 | Garter et al. | 56/10.2 |
| 5,115,628 | * 5/1992 | Garter et al. | 56/10.2 E |

* cited by examiner

*Primary Examiner*—Thomas B. Will
*Assistant Examiner*—Meredith Petravick

(57) ABSTRACT

A height sensing shoe assembly for an implement such as a cotton harvester includes an arm pivotally connected at an upper end to the lower portion of a harvester row unit for rocking about an arm axis transverse to the forward direction. A shoe or ski elongated in the fore-and-aft direction is pivotally connected at a central location to the lower end of the arm for rocking about an axis parallel to the arm axis. The elongated pivoting shoe tends to bridge peaks and valleys in the soil surface irregularities proving a mechanical averaging effect to reduce the range of pivoting of the arm as the unit passes the irregularities. An actuator connected to the arm and responsive to arm pivoting controls the lift system to maintain the height of the unit above the ground within a preselected range. The range of pivoting of the shoe relative to the horizontal changes with movement of the row unit between the transport position and field-working position to prevent digging in of the shoe as the unit is lowered without adversely affecting the desired pivot range in the operating position of the unit.

14 Claims, 4 Drawing Sheets

DUAL PIVOT HEIGHT SENSING SHOE ASSEMBLY

BACKGROUND OF THE INVENTION

1). Field of the Invention

The present invention relates generally to agricultural implements and, more specifically, to a height sensing shoe arrangement for an automatic height control on an implement or harvester.

2). Related Art

Harvesters such as cotton pickers include row units having height sensing shoes for automatic height adjustment to maintain an optimum unit operating position during harvesting. Each shoe is pivotally connected to an associated unit for rocking about an axis transverse to the forward direction of travel so a small portion of the shoe remains in contact with the soil. A rod is connected between the shoe and a valve or switch structure which responds to pivoting of the shoe to operate a row unit hydraulic lift to raise and lower the unit as necessary to maintain the optimum position. Often the harvester is operated in crusted or uneven field conditions, and the shoe rapidly pivots up and down as the harvester moves over closely spaced undulations in the soil surface. Such pivoting causes a corresponding rapid and undesirable movement of the valve or switch structure thereby inputting a less than optimum control signal to the hydraulic lift system. The rapid shoe pivoting caused by the small contact area riding over the soil surface increases forces and wear in the control system and in the hydraulic lift system. Although averaging to reduce rapid row unit movement can be accomplished electronically or hydraulically, the increase in system cost, complexity and response time usually makes such a fix undesirable. The small soil contact area on the shoe also results in rapid wear which necessitates time-consuming shoe replacements.

BRIEF SUMMARY OF THE INVENTION

It is therefore an object of the present invention to provide an improved height sensing shoe assembly for a harvester. It is a further object to provide such an assembly which overcomes most or all of the aforementioned problems.

It is a further object of the present invention to provide an improved height sensing shoe assembly for a harvester which helps to optimize the control signal to the harvester lift system. It is a further object to provide such a shoe assembly which reduces undesirable rapid lift system reversing when the harvester is passing over closely spaced peaks and valleys in the soil surface. It is a further object to provide such an assembly which is simple, easy to mount and inexpensive. It is yet another object to provide such an assembly having an improved shoe which wears longer and more evenly than at least most previously available shoe assemblies.

It is another object of the present invention to provide an improved height sensing shoe assembly for a harvester which provides an averaging effect for closely spaced surface irregularities in the soil to reduce unwanted shoe pivoting and rapid lift system corrections. It is another object to provide such an assembly which utilizes a simple mechanical arrangement to provide an averaging effect without sacrificing system response time.

In accordance with the above objects, a height sensing shoe assembly for an implement such as a cotton harvester includes an arm with an upper end pivotally connected to the lower portion of a harvester row unit for rocking about an arm axis transverse to the forward direction. A shoe or ski elongated in the fore-and-aft direction includes a central location pivotally connected to the lower end of the arm for rocking about a shoe axis parallel to the arm axis. The elongated pivoting shoe tends to bridge peaks and valleys in the soil surface irregularities providing a mechanical averaging effect to reduce a unnecessary pivoting of the arm as the unit passes the irregularities. An actuator connected to the arm and responsive to the angle of the arm relative to the row unit controls the lift system to maintain the height of the unit above the ground within a preselected range. The averaging effect is achieved without need for expensive electronic or hydraulic components and without sacrificing system response time. The simple, inexpensive arrangement reduces rapid lift system reversing as the unit passes over closely spaced undulations in the soil surface. The pivoting shoe helps to keep the surface of the shoe generally parallel to the ground surface and to spread frictional soil contact over a larger area so that the shoe wears longer and more evenly. The range of pivoting of the shoe relative to the horizontal changes with movement of the row unit between the transport position and field-working position to prevent digging in of the shoe as the unit is lowered without adversely affecting the desired pivot range in the operating position of the unit. The assembly may be retrofitted easily to existing harvesters.

These and other objects, features and advantages of the present invention will become apparent to one skilled in the art upon reading the following detailed description in view of the drawings.

DETAILED DESCRIPTION OF THE DRAWINGS

Figure 1:
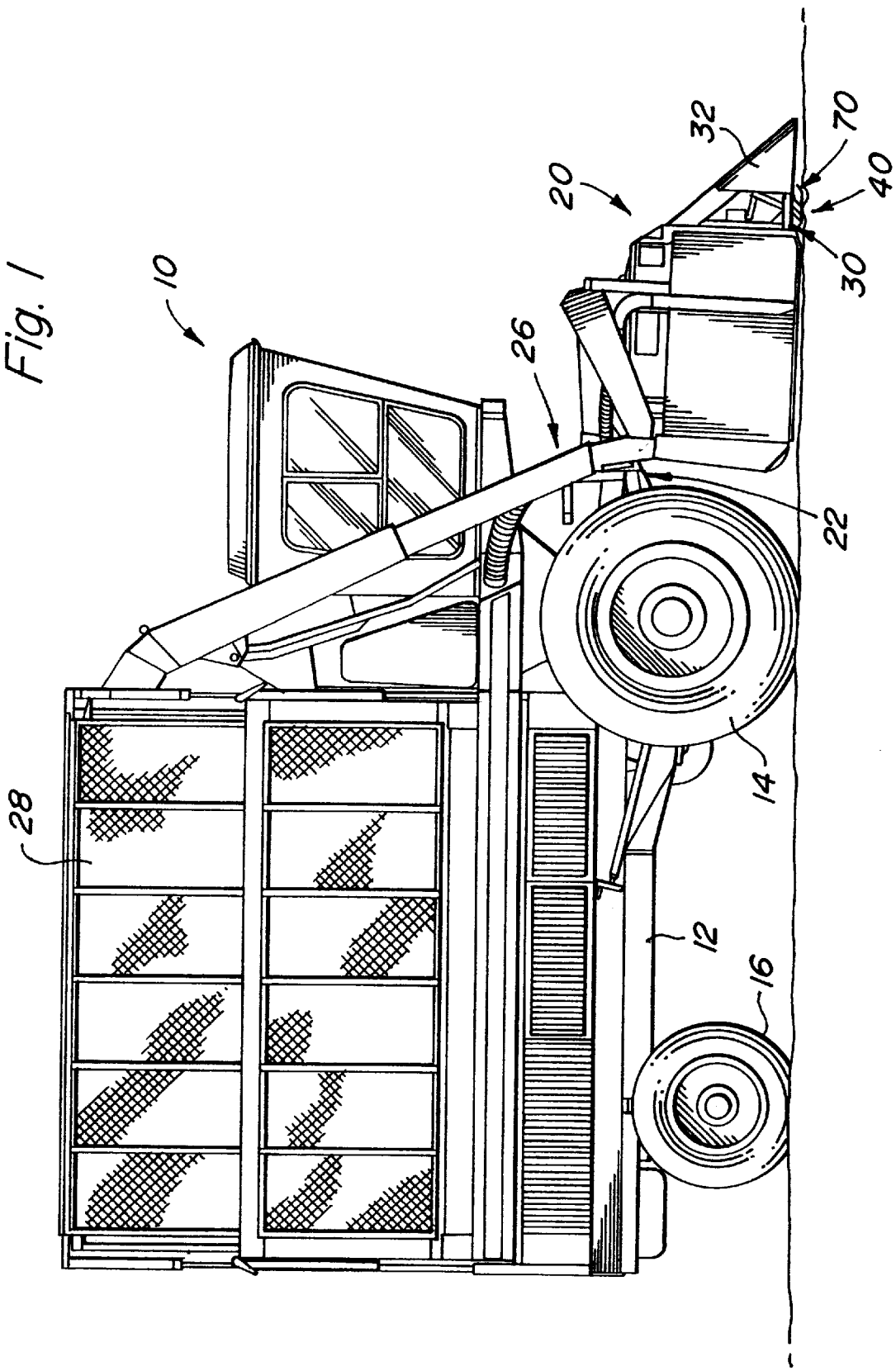
FIG. 1 is a side view of a harvester with a height sensing shoe assembly.

Referring now to FIG. 1, therein is shown a cotton harvester 10 including a main frame 12 supported for forward movement over a field of plants to be harvested by forward drive wheels 14 and rear steerable wheels 16. Transversely spaced row harvesting units 20 are supported from the forward end of the frame 12 by one or more conventional hydraulically controlled lift structures 22. The row units 20 remove cotton from rows of the plants, and an air duct system 26 directs the removed cotton rearwardly and upwardly into a basket 28.

The row unit 20 includes a forward frame assembly 30 supporting stalk lifter structure 32 which helps to guide the row of plants into the unit. A height sensing shoe assembly 40 is supported from the frame assembly 30 and is operably connected to lift control structure 42 such as a hydraulic valve which controls the lift structure 22 in response to movement of the shoe assembly 40 to raise and lower the unit 20 and maintain the unit at a generally constant height above the ground during field operations as ground and surface conditions vary.

Figure 5:
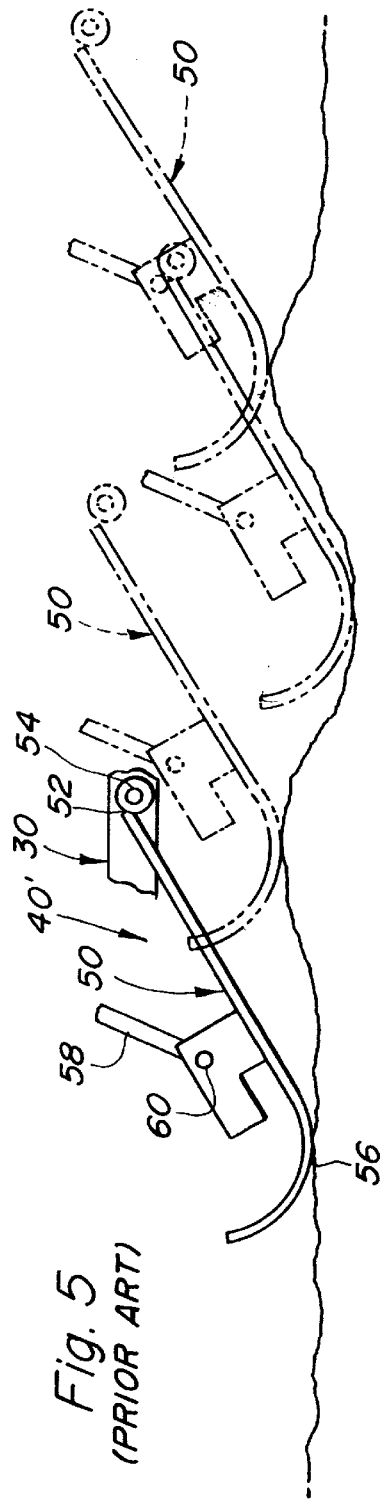
FIG. 5 is a side view illustrating the operation of a height sensing shoe typical of the prior art when operating over an irregular ground surface.

Description of a Prior Art Shoe Assembly:

A shoe assembly typical of the prior art is shown generally at 40' in FIG. 5 and includes a shoe 50 having an upper end 52 pivotally connected at 54 to a lower portion of the frame assembly 30. The shoe 50 includes a ground-contacting end 56 which curves upwardly in the rearward direction so that a small area of the shoe contacts and follows the soil contours. A link 58 includes a lower end pivotally connected to the shoe 50 at a location 60 just above and forwardly of the ground-contacting end 56. The upper end of the link 58 (not shown) is operably connected to the lift control structure 42 to control the lift structure 22 to raise and lower the unit 20 in response to upward and downward pivoting of the end 56 about the location 54. As can be appreciated from FIG. 5, the small area of contact of the end 56 with the ground allows the shoe 50 to follow very closely spaced undulations in the ground surface which results in rapid raise and lower signals being supplied via the link 58 to the lift control structure 42. This undulating signal in turn causes corresponding rapid changes in the hydraulic fluid flow to the lift cylinders which move the lift structure 22. Such rapid changes are unnecessary and undesirable, and result in increased forces and wear in the overall lift control system. Further, the relatively small area of contact of the end 56 speeds wear in that area of the shoe and results in frequent shoe replacement.

Figure 4:
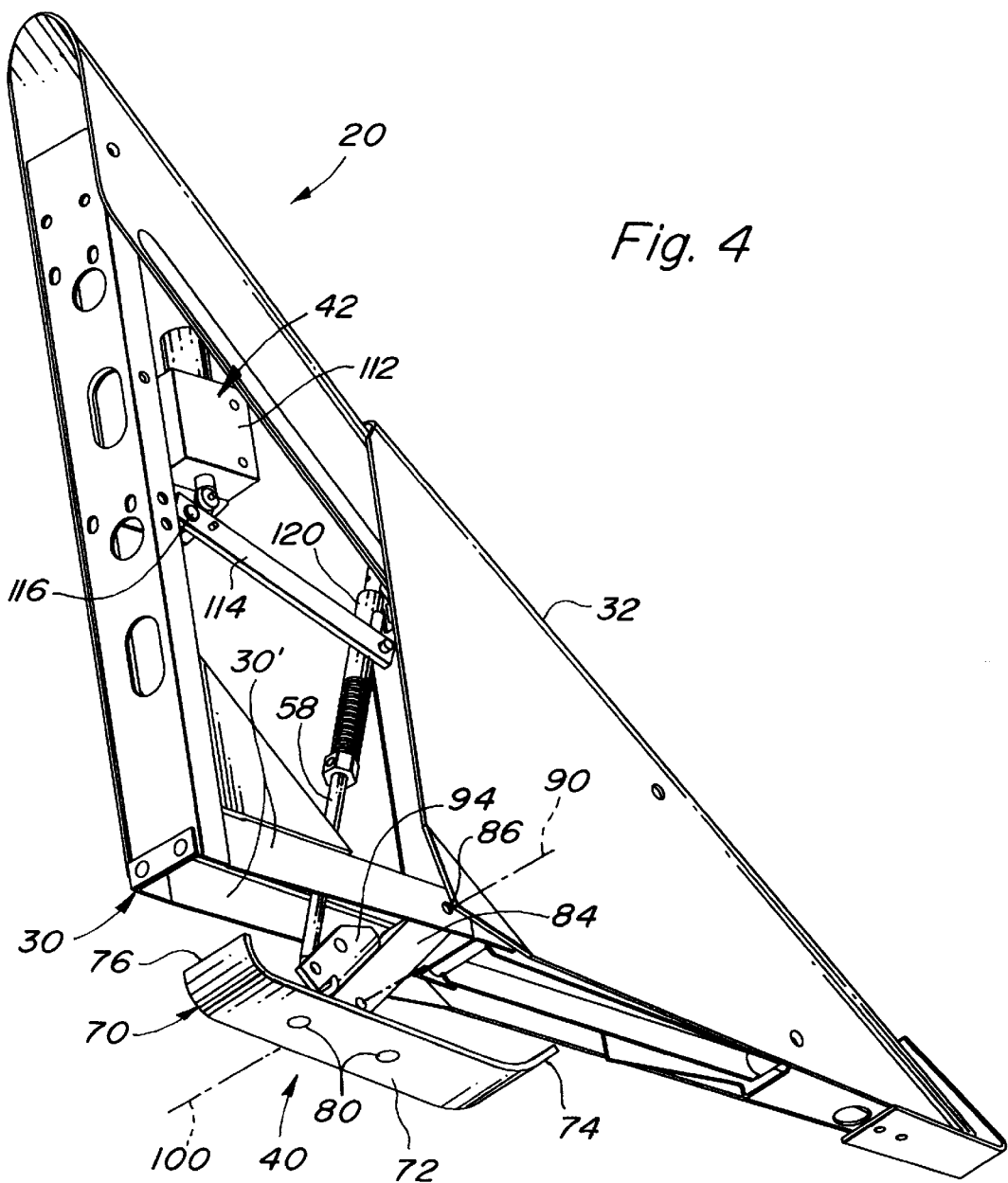
FIG. 4 is a lower perspective view of the height sensing shoe assembly.
Figure 6:
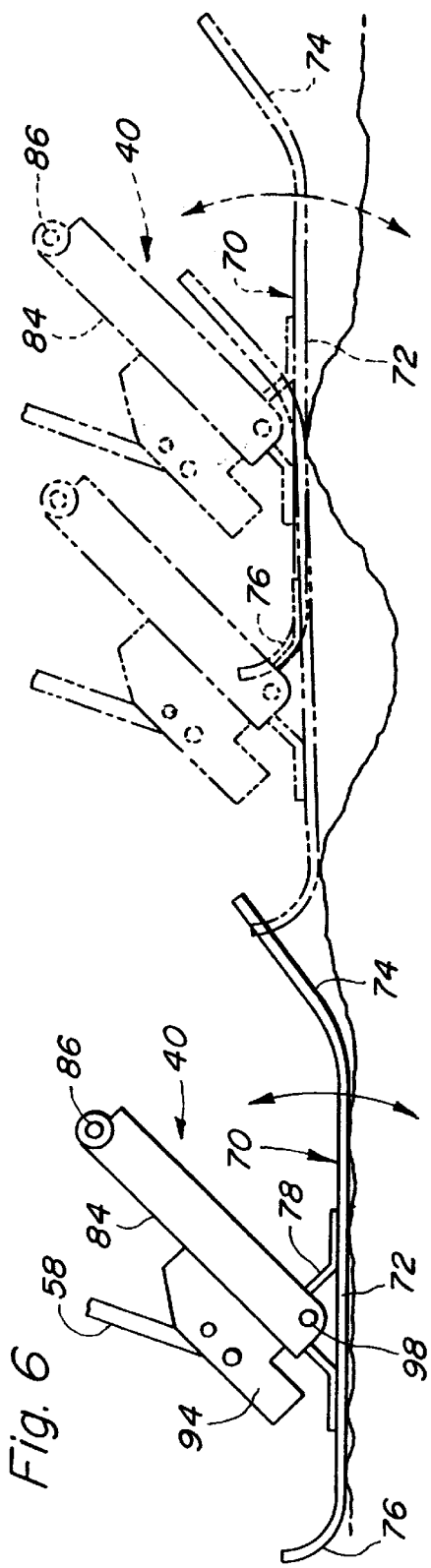
FIG. 6 is a view similar to FIG. 5 but showing operation of the height sensing shoe assembly of the present invention.

Description of an Improved Shoe Assembly:

The shoe assembly 40 (FIGS. 1–4 and 6) includes an elongated ski or shoe 70 having a central, generally planar portion 72 and forward and aft ends 74 and 76. A pivot support 78 is connected to the top side of the central planar portion by suitable connectors 80 (FIG. 4) such as bolts or rivets. An arm 84 includes an upper end connected at location 86 between opposite sides 30' of the frame assembly 30 for pivoting about a transversely extending arm axis indicated generally at 90. The arm 84 extends downwardly and rearwardly from the pivot location 86, and an apertured bracket 94 fixed to the lower end projects upwardly from the arm 84. Preferably, the shoe 70 has a substantial length to reduce undulations of the system as the shoe passes over closely spaced irregularities in the ground surface (FIG. 6).

A pivot 98 connects the lower end of the arm 84 to the pivot support 78 on the central portion 72 of the shoe 70. The shoe 70 can rock over a range of angular positions relative to the arm 84 about a shoe axis indicated generally at 100. The shoe axis is generally parallel to and offset rearwardly and below the arm axis 90. The forward end 74 and the aft end 76 of the shoe 70 can move above and below the level of the pivot 98. As shown, the length of the shoe 70 is on the order of twice the distance between the pivot location 86 and the pivot 98.

Figure 2:
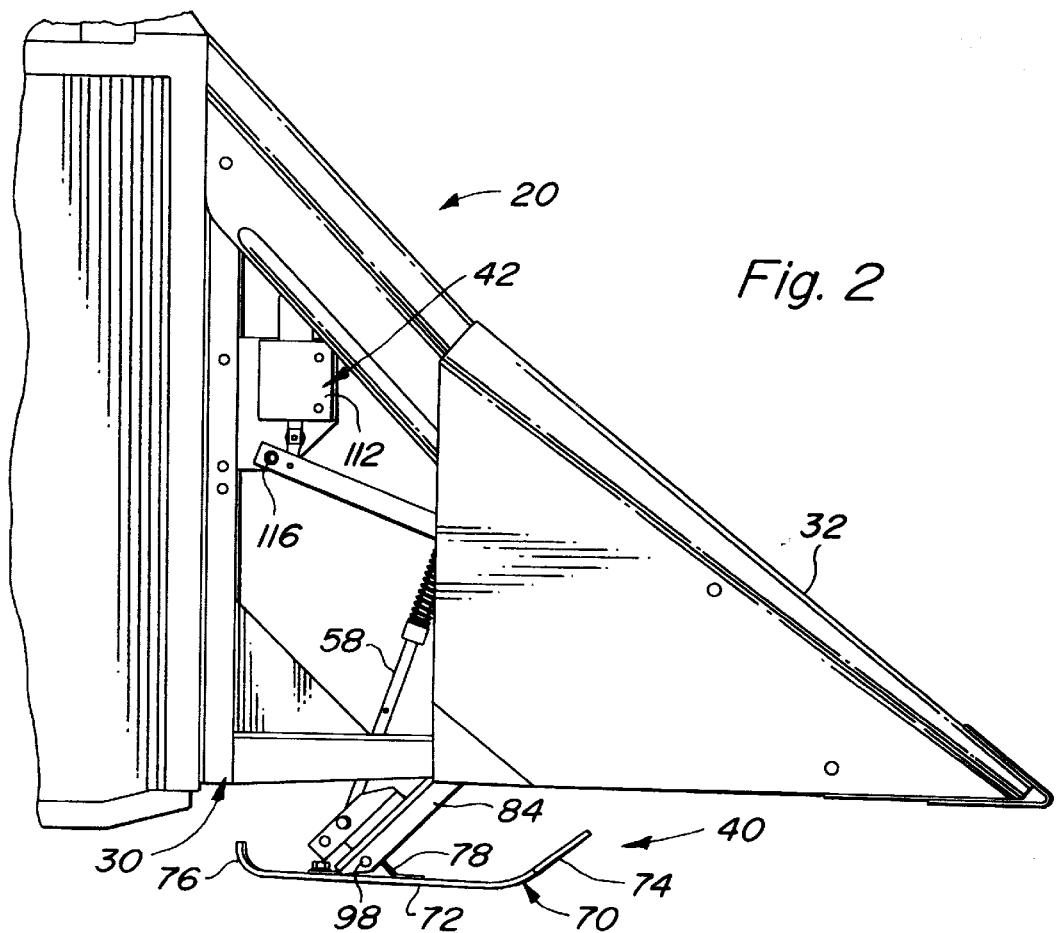
FIG. 2 is an enlarged side view of a portion of the row unit on the harvester of FIG. 1 with a panel removed to better show the height sensing shoe assembly.
Figure 3:
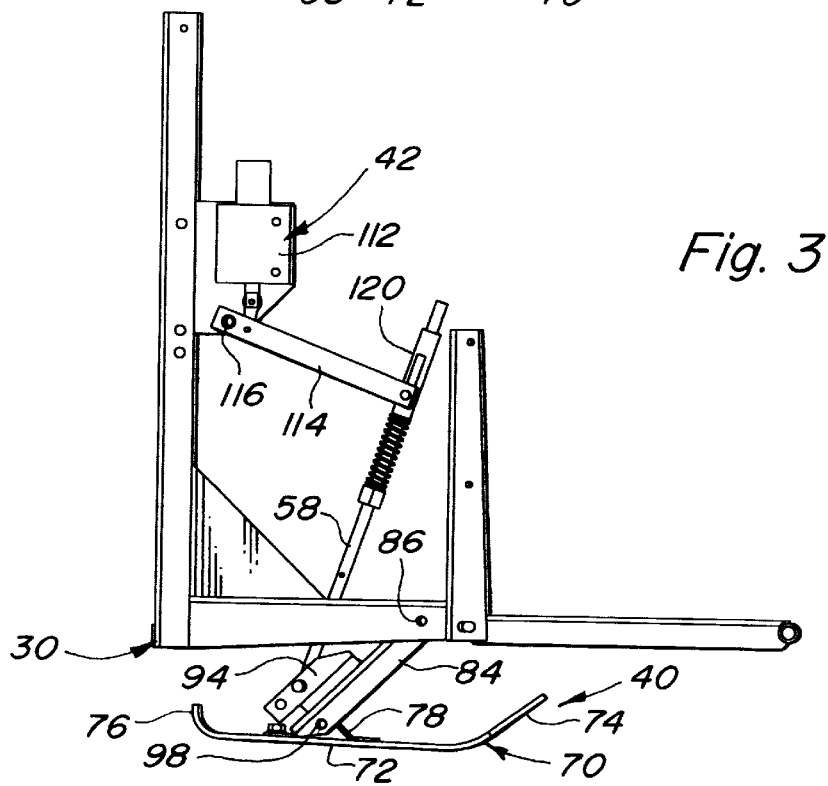
FIG. 3 is view similar to FIG. 2 but with the stalk lifter removed.

When the unit 20 is raised from the field-working position, the arm 84 pivots downwardly in the counter-clockwise direction. With the unit 20 raised, pivoting of the shoe in the clockwise direction is limited as the top surface of the central portion 72 contacts the lower portion of the arm 84 to the rear of the pivot 98 (FIG. 2). This contact limits substantial downward inclination of the shoe 70 in the raised position of the unit 20 and prevents the forward end 74 of the shoe from digging in when the unit is first lowered to the field-working position. In the raised position of the unit 20, counter-clockwise pivoting of the shoe 70 is limited (to approximately 20 degrees from the horizontal) as the shoe contacts the frame assembly 30. As the unit 20 is lowered to the field-working position and the shoe 70 contacts the ground, the arm 84 is pivoted in the clockwise direction about the arm axis 90. This rearward and upward rocking of the arm 84 allows more downward movement of the forward end 74 before the central portion 72 contacts the arm 84 to permit the shoe 70 to better follow ground contour when the unit 20 is operating in the field. Therefore, digging-in protection is provided for the shoe 70 while the unit 20 is being lowered from the raised position without compromising ground-following ability when the unit is in the operating position in the field.

The lower end of the link 58 is connected to one of two or more apertured locations in the bracket 94, depending on the desired sensitivity of the system. As shown, the lift control structure 42 includes a hydraulic valve 112 having a spool connected to an operating link 114 pivotally connected at one end 116 to the frame assembly 30. The opposite end of the link 114 is connected to a spring-cushioned connector 120 located on the link 58. In the operating position of the unit 20, downward (counter-clockwise) pivoting of the arm 84 by the shoe 70 pivots the link 114 downwardly to operate the valve 112 to lower the row unit 20. Upward pivoting of the arm 84 moves the link 114 upwardly to operate the valve 112 to raise the unit 20. The connector 120 prevents damage to the control structure 42 if the link 58 continues to move upwardly after the spool of the valve 112 has reached a limit position. Although a hydraulic valve 112 is shown, it is to be understood that an electronic or electrohydraulic system could be utilized in the control structure 42.

The shoe 70 is free to pivot as necessary in the operating position of the unit 20 to follow the ground contour and provide a relatively large shoe contact area. The shoe 70 also bridges closely spaced irregularities in the ground surface (see FIG. 6), thereby providing an averaging effect and reducing unwanted rapid undulations in the control and lift systems without adversely affecting system response time.

Having described the preferred embodiment, it will become apparent that various modifications can be made without departing from the scope of the invention as defined in the accompanying claims.

What is claimed is:

1. A harvesting unit adapted for movement in a forward direction over soil having an irregular soil surface, the harvesting unit including lift structure for raising and lowering the unit relative to the soil surface during operation in a field and for raising and lowering the unit between transport and field-working positions, and a height sensing shoe assembly including:

an arm having upper and lower ends, the upper end pivotally connected to the harvesting unit for rocking vertically about an arm axis generally transverse to the forward direction;

a soil contacting shoe elongated in the forward direction and having a central portion;

a pivot connecting the central portion of the shoe to the lower end of the arm for rocking about a shoe axis generally parallel to the arm axis;

an actuator member responsive to the rocking of the arm about the arm axis for operating the lift structure to maintain a preselected position of the unit relative to the soil surface;

wherein the rocking of the shoe about the shoe axis reduces rocking of the arm about the arm axis as the shoe passes over irregularities in the soil surface to thereby limit vertical fluctuations of the arm and provide a mechanical averaging effect to the actuator member as the shoe passes over the irregularities; and wherein the arm includes a contact area limiting the rocking of the shoe about the shoe axis to a preselected angular range relative to the horizontal, the angular range changing as the unit is moved between the field-working and transport positions.

2. The harvesting unit as set forth in claim 1 wherein the shoe includes a forward end located forwardly of the pivot, and an aft end located rearwardly of the pivot.

3. The harvesting unit as set forth in claim 2 wherein the central portion is generally planar, and wherein the forward and aft ends are turned upwardly from the plane of the central portion.

4. The harvesting unit as set forth in claim 2 wherein the arm pivot and shoe pivot are offset from each other a preselected distance, and wherein the length of the shoe is substantially greater than the preselected distance.

5. The harvesting unit as set forth in claim 4 wherein the length of the shoe is at least about twice the preselected distance.

6. A harvesting unit adapted for movement in a forward direction over soil having an irregular soil surface, the harvesting unit including lift structure for raising and lowering the unit relative to the soil surface during operation in a field and for raising and lowering the unit between transport and field-working positions and a height sensing shoe assembly including:

an arm having upper and lower ends, the upper end pivotally connected to harvesting unit for rocking vertically about an arm axis generally transverse to the forward direction;

a soil contacting shoe elongated in the forward direction and having a central portion;

a pivot connecting the central portion of the shoe to the lower end of the arm for rocking about a shoe axis generally parallel to the arm axis;

an actuator member responsive to the rocking of the arm about the arm axis for operating the lift structure to maintain a preselected position of the unit relative to the soil surface;

wherein the rocking of the shoe about the shoe axis reduces rocking of the arm about the arm axis as the shoe passes over irregularities in the soil surface to thereby limit vertical fluctuations of the arm and provide a mechanical averaging effect to the actuator member as the shoe passes over the irregularities;

wherein the shoe includes a forward end located forwardly of the pivot, and an aft end located rearwardly of the pivot; and wherein the forward and aft ends are rockable vertically about the shoe axis over ranges extending above and below the level of the shoe axis, the ranges changing with movement of the unit between the transport and field-working positions to prevent digging in of the shoe when lowering the unit to the field-working position.

7. A harvesting unit adapted for movement in a forward direction over soil having an irregular soil surface, the harvesting unit including lift structure for raising and lowering the unit relative to the soil surface during operation in a field and for raising and lowering the unit between transport and field-working positions, and a height sensing shoe assembly including:

an arm having upper and lower ends, the upper end pivotally connected to harvesting unit for rocking vertically about an arm axis generally transverse to the forward direction;

a soil contacting shoe elongated in the forward direction and having a central portion;

a pivot connecting the central portion of the shoe to the lower end of the arm for rocking about a shoe axis generally parallel to the arm axis;

an actuator member responsive to the rocking of the arm about the arm axis for operating the lift structure to maintain a preselected position of the unit relative to the soil surface;

wherein the rocking of the shoe about the shoe axis reduces rocking of the arm about the arm axis as the shoe passes over irregularities in the soil surface to thereby limit vertical fluctuations of the arm and provide a mechanical averaging effect to the actuator member as the shoe passes over the irregularities;

wherein the arm includes a contact area limiting the rocking of the shoe about the shoe axis to a preselected angular range relative to the horizontal, the angular range changing as the unit is moved between the field-working and transport positions; and wherein the preselected angular range includes angles wherein the shoe is angled upwardly in the forward direction from a horizontal plane and downwardly in the forward direction from the horizontal plane when the unit is in the field-working position.

8. The harvesting unit as set forth in claims 7 wherein the actuator member includes a link having a lower link end pivotally connected to the arm and an upper end operably connected to the lift structure.

9. The harvesting unit as set forth in claim 8 including a bracket fixed to the lower end of the arm, and wherein the lower link end is connected to the bracket.

10. A harvesting unit adapted for movement in a forward direction over soil having an irregular soil surface, the harvesting unit including lift structure for raising and lowering the unit relative to the soil surface, and a shoe assembly including:

an arm having upper and lower ends, the upper end pivotally connected to the harvesting unit for rocking vertically about an arm axis;

an elongated soil contacting shoe;

a pivot connecting the shoe to the lower end of the arm for rocking about a shoe axis generally horizontal and perpendicular to the forward direction;

an actuator member responsive to the rocking of the arm about the arm axis for operating the lift structure to maintain a preselected position of the unit relative to the soil surface;

wherein the rocking of the shoe about the shoe axis maintains a substantial portion of the shoe in contact with the soil on opposite fore-and-aft sides of the shoe axis; and wherein the arm includes a stop portion contacting the shoe and limiting downward rocking of the forward end of the shoe when the unit is raised to a transport position thereby preventing digging of the forward end into the soil as the unit is moved downwardly from the transport position.

11. The harvesting unit as set forth in claim 10 wherein the shoe extends forwardly from the pivot to a forward end and rearwardly from the pivot to an aft end, and wherein the shoe has a length sufficient so the ends bridge closely spaced irregularities in the soil surface to thereby reduce rocking of the arm about the arm axis as the shoe passes over the irregularities and provide a mechanical averaging effect to the actuator member as the shoe passes over the irregularities.

12. The harvesting unit as set forth in claim 10 wherein the stop portion limits downward rocking of the forward end to a non-digging position approximately level with the aft end when the unit is in the transport position and facilitates substantial downward pivoting of the forward end from the non-digging position when the unit is operating in a lowered position.

13. The harvesting unit as set forth in claim 10 wherein the shoe axis and arm axis are generally parallel to each other and transverse to the forward direction.

14. The harvesting unit as set forth in claim 13 wherein the shoe has a preselected length, and the shoe axis and the arm axis are separated by a distance substantially less than the preselected length.

* * * * *